United States Patent [19] [11] 3,992,179
Simmons [45] Nov. 16, 1976

[54] GLASS CERAMIC AND PROCESS THEREFOR
[75] Inventor: George A. Simmons, Toledo, Ohio
[73] Assignee: Owens-Illinois, Inc., Toledo, Ohio
[22] Filed: May 17, 1971
[21] Appl. No.: 144,314

Related U.S. Application Data
[62] Division of Ser. No. 558,238, June 17, 1966, abandoned.

[52] U.S. Cl. ................................. 65/30 E; 65/33
[51] Int. Cl.² .................. C03C 21/00; C03C 3/22
[58] Field of Search ............................ 65/30, 33

[56] References Cited
UNITED STATES PATENTS

| | | | |
|---|---|---|---|
| 2,920,971 | 1/1960 | Stookey | 106/39 |
| 3,253,975 | 5/1966 | Olcott et al. | 161/1 |
| 3,282,770 | 11/1966 | Stookey et al. | 161/1 |
| 3,428,513 | 2/1969 | Denman | 161/1 |
| 3,498,775 | 3/1970 | Simmons | 65/33 |
| 3,524,738 | 8/1970 | Grubb et al. | 65/134 |
| 3,573,020 | 3/1971 | Karstetter | 65/30 |
| 3,585,054 | 6/1971 | Karstetter | 106/39 |
| 3,647,489 | 3/1972 | McMillan et al. | 65/30 |

Primary Examiner—S. Leon Bashore
Assistant Examiner—Kenneth M. Schor
Attorney, Agent, or Firm—Richard D. Heberling; E. J. Holler

[57] ABSTRACT

This invention relates generally to articles of glass-ceramic, including glass components of articles, and to processes for manufacturing these glass-ceramic articles. Specifically, a glass article is crystallized in bulk, ion exchanged to add lithium to the surface layer, and heated to crystallize the surface layer where the coefficient of expansion of the surface is less than that of the main body.

2 Claims, No Drawings

GLASS CERAMIC AND PROCESS THEREFOR

The present application is a divisional of application Ser. No. 558,238, filed June 17, 1966 and now abandoned.

More particularly, the present invention relates to a glass-ceramic article having a main body portion and at least one integral surface layer that differs from the body portion in some manner. The main body portion of the article is a glass-ceramic including at least 1% by weight, expressed as soda mole equivalent, of an oxide of at least one alkali metal, i.e., including an alkali metal oxide in a concentration that, if not soda, its replacement by an equivalent molar amount of soda would provide a composition containing at least 1% by weight of soda, based only on the substituted soda. In other words, any soda already present in the composition is not considered as being soda in the computation of the 1% limitation based on the alkali metal molar equivalent substitution. At least 2% by weight is preferred.

That different surface layer of the article is either a glass or a glass-ceramic that (1) has an overall composition in which (a) the lithia content when the layer is a glass-ceramic is at least equal to and when the layer is a glass is greater than the lithia content in the overall composition of the main body portion and (b) the content of oxide of alkali metal, having an ionic radius larger than lithium, when the layer is a glass-ceramic is at a maximum equal to and when the layer is a glass is less than the content of that oxide in the overall composition of the glass-ceramic main body portion, and (2) has a lower coefficient of linear expansion than that of the main body portion. The article has a compressive stress in that surface layer and a tensile stress in the main body portion.

The surface layer has a composition in which the mole percentage concentration of any alkaline earth metal oxide is usually equal to the mole percentage concentration of the same alkaline earth metal oxide, if present, in the main body portion of the article. Some loss of alkaline earth metal oxide in the surface layer may occur during the making of the article in the event a high temperature is used in some cases of heat treatment, but its content remains substantially unchanged.

In accordance with this invention, the article of the invention can be made by carrying out one of the processes of the invention. Some of the processes are alternatives that can use an article of the same initial glass, whereas the use of these alternative processes or other processes is dependent upon the nature of the initial glass of the article to be treated for the manufacture of the article of the present invention.

In the article of the invention in which both the main body portion and that surface layer are glass-ceramics, either the crystalline phase of the surface layer differs from that of the main body portion or the glass matrix of the surface layer differs in lithia content from that of the main body portion. Both differences may be present. When the difference is the lithia content of the glass matrix, the predominant crystal in the crystalline phase of the surface layer may have either the same as or a greater lithia content than that of the predominant crystal of the crystalline phase of the main body portion.

In carrying out all embodiments, except one, of the process of the present invention there is provided at some stage of the process an ion-exchange treatment in which the lithia content of the surface layer is increased without a comparable increase of the lithia content of the main body portion of the initial or intermediate article. In the ion-exchange step at least part of the content of an alkali metal ion having a larger ionic radius is replaced in the surface layer by lithium ions to obtain the product of this invention. Usually the process requires steps after the ion exchange but in one embodiment it is the last important step. The alkali metal ion having the larger ionic radius that is replaced by lithium ion is preferably sodium ion.

An illustrative embodiment of the product of the invention has as the glass-ceramic of the main body portion of the article a crystalline phase in which beta-spodumene predominates and as the surface layer a glass-ceramic in which (1) the same crystal predominates in the crystalline phase but the glass matrix of the surface layer has a higher lithia content or (2) the surface layer has beta-eucryptite crystals predominant in the crystalline phase regardless of any difference in the glass matrix. In either event the surface layer of the article has a lower average coefficient of linear expansion than that of the main body portion of the article and as a result the surface layer has a compressive stress and the main body portion has a tensile stress to provide a greater flexural strength than that of an article entirely of the same glass-ceramic as that main body portion.

In another illustrative embodiment, the main body portion is a glass-ceramic, that has an average coefficient of linear expansion substantially higher than glass-ceramic in which beta-spodumene is the predominant crystal in the crystalline phase, and the surface layer is (1) a glass-ceramic with the same type of crystalline phase as the main body portion but with a greater concentration of crystalline phase or with a glass matrix that has a lower linear coefficient of expansion than the glass matrix of the main body portion, or (2) a glass with primarily a higher lithia content than the glass-ceramic of the main body portion. When the surface layer is a glass, the glass-ceramic of the main body may have an average linear coefficient of expansion somewhat less than, but preferably greater than, that of a thermally crystallizable glass of the same overall composition so that due to the higher lithia content of the glass layer in that article of the invention the glass has an average coefficient of linear expansion substantially less than that of the glass-ceramic main body portion.

In one embodiment of the process of the invention, the composition of the thermally crystallizable glass, used to form the initial article, contains a concentration of an oxide of an alkali metal that inhibits the rate of bulk crystallization so that for a particular heat treatment the rate of such crystallization is substantially less than that of a composition differing only by the absence of that alkali metal oxide. This inhibition can be enhanced by using a composition in which an ingredient that combines with alumina and silica during bulk in situ crystallization is present in the low portion of its required range of concentration in the glass for the latter to be a thermally crystallizable glass. The nucleant content in the glass is within the range required for bulk crystallization and is preferably above the minimum portion of the range. As a result, the glass article can be heated to an elevated temperature, e.g., 600° to 700° C., which is substantially below its softening point, to obtain surface cystallization which provides a surface layer that does not soften when the article is then heat treated at higher temperatures for nucleation and finally still higher tempertures for bulk crystallization of the main body portion of the article. Of course, the temperature used for surface crystallization, which does not require nucleation of the nucleant in the surface layer, may be at the temperature that provides such nucleation in the main body portion. In any event, the surface layer of glass-ceramic obtained by surface crystallization minimizes sagging or other shape change during the bulk crystallization.

This latter embodiment of the process of the invention is useful in the other embodiments in which the article of glass-ceramic obtained by the bulk crystallization is further treated by additional steps including ion exchange, but is also useful in making that glass-ceramic article itself. To accelerate the rate of surface crystallization, the original glass article may be ion exchanged when another alkali metal oxide is one of the ingredients that participates to form a crystalline phase. In such case, an ion exchange step is performed on the glass to replace in its surface layer at least part of the inhibiting alkali metal ion by the participating alkali metal ion. For examle, in a glass that forms by crystallization glass-ceramic in which the crystalline phase contains beta-eucryptite or beta-spodumene or both, sodium is the inhibiting ion and is replaced by lithium in a surface layer prior to the surface crystallization. In the event the foregoing process is followed by conversion of the surface layer to glass with subsequent crystallization of the surface layer, ion exchange of the glass surface layer is not performed prior to the crystallizaton of it to a glass-ceramic having a different crystalline phase than that of the main body portion, unless a thicker surface layer is desired.

BACKGROUND OF THE INVENTION

Glasses that are controllably crystallizable by a heat treatment are commonly referred to as thermally crystallizable glass compositions. The glass-ceramics are the products obtained from these controllably crystallizable inorganic glasses by a suitable heat treatment, and glass-ceramics are also referred to as thermally crystallized glasses. Thus the term "noncrystalline glass" excludes glass-ceramics but for convenience the term "glass" is used in this application to provide such exclusion and, therefore, to mean noncrystalline glass.

There are many types of silicate glasses that are thermally crystallizable glass compositions. A glass-ceramic body contains many small crystals in a glass matrix. The crystalline phase of glass-ceramics can contain one or more crystalline materials. The crystalline materials that are formed depend upon the original composition of the thermally crystallizable glass and often depend upon the nature of the heat treatment.

The expansion coefficient of thermally crystallizable glass is dependent upon the glass composition. There can be a substantial difference between the expansion coefficients of thermally crystallizable glasses that are not members of the same glass system. Also, the expansion coefficients of the glass-ceramics can differ greatly. The actual expansion coefficient of a glass-ceramic depends on the compositional ingredients and on the temperatures and times of the heat treatment used to form the glass-ceramic from the thermally crystallizable glass.

Articles of glass-ceramic material are made by melting batch ingredients to provide molten thermally crystallizable glass and thereafter forming from the molten glass by conventional means, such as press molding, casting, blow molding, and tube and rod drawing, useful glass articles. One type of useful article is tableware such as plates, cups, and tea pots. Tableware is usually made by pressing in a mold or by blow molding techniques. The articles of thermally crystallizable glass are subjected to a controlled heat treatment to convert the glass to a glass-ceramic.

Some glass-ceramics are compositions that contain one or more alkali metals, expressed as oxide as part of an overall composition also expressed primarily as oxides. Many of the thermally crystallizable glass compositions are of the lithia-alumina-silica system containing a minor amount of at least one nucleating agent for the glass, such as $ZrO_2$, $TiO_2$ and $SnO_2$. By controlled in situ crystallization there is obtained glass-ceramic that contains in a glass matrix predominantly lithia-containing crystalline phases, either beta-eucryptite or beta-eucryptite-like crystals or beta-spodumene or beta-spodumene-like crystals, or both, as indicated by X-ray diffraction data.

Copending U.S. patent application Ser. No. 352,958, filed on Mar. 18, 1964, by William E. Smith and entitled "Glasses, Ceramics and Method", with a common assignee, now U.S. Pat. No. 3,380,818 discloses and claims another class of glasses and glass-ceramics that comprise silica, alumina, lithia, magnesia and a limited amount of both zirconia and titania. That application is hereby incorporated by reference.

U.S. application Ser. No. 352,958 describes the manner of heat treatment to convert the crystallizable glass composition to glass-ceramic. The maximum temperature reached in the heat treatment ranges from about 1400° to 2100° F. and the period of time at the final temperature used is dependent upon the degree of crystallization desired in the product and upon the actual maximum temperature. When the maximum temperature is limited to the range of about 1400° to about 1675° F. it is indicated in that patent application that in the crystalline phase that is formed beta-eucryptite or beta-eucryptite-like crystals predominate. When the final or maximum temperature of the heat treatment is above about 1650° F. the crystals formed constitute a mixture of beta-eucryptite and beta-eucryptite-like crystals and beta-spodumene and beta-spodumene-like crystals. At the maximum heat treatment temperatures of about 1800° to 2100° F. the crystalline phase is primarily beta-spodumene crystals and beta-spodumene-like crystals.

The glass-ceramic of that patent application has an expansion coefficient that is dependent upon the final temperature of the heat treatment. When the glass-ceramic results from a final heat treatment temperature of a maximum of about 1675° F., the expansion coefficient is substantially lower than when a higher final temperature for the heat treatment is used. In other words, the glass-ceramic, in which the crystalline phase can be considered as being beta-eucryptite, has a substantially lower expansion coefficient than the glass-ceramic of the same composition having a crystalline phase that can be considered as being beta-spodumene.

Copending U.S. patent application Ser. No. 464,147 filed by Clarence L. Babcock, Robert A. Busdiecker and Erwin C. Hagedorn on June 15, 1965, and entitled "Product and Process for Forming Same" with common assignee now abandoned discloses and claims a further class of thermally crystallizable glass compositions and glass-ceramics made from these glasses. That application is hereby incorporated by reference.

The Babcock et al. patent application Ser. No. 464,147 discloses the discovery that a crystallizable glass composition, containing the following essential components, present in the glass composition in the following weight percent limits, can be treated at a finishing temperature that can be varied at the maximum within about 50° to 100° F. or more, without affecting the substantially uniform, low expansion characteristics imparted to the transparent glass-ceramic which is formed, the glass-ceramic having a coefficient of linear expansion of about $-10 \times 10^{-7}$ to about $10 \times 10^{-7}$ per ° C. over the range 0° to 300° C.

| Component | Weight Percent |
|---|---|
| $SiO_2$ | 56 – 68 |
| $Al_2O_3$ | 18 – 27 |
| $Li_2O$ | 3.4 – 4.5 |
| CaO | 0 – 3 |
| ZnO | 0 – 2 |
| $B_2O_3$ | 0 – 4 |
| $TiO_2$ | 0 – 6 |
| $ZrO_2$ | 0 – 3 |
| MgO | 0 – 3 |
| $Na_2O$ | 0 – 1 |
| $P_2O_5$ | 0 – 3 |
| $(SiO_2 + Al_2O_3)$ | at least 82 |
| $(SiO_2+Al_2O_3+B_2O_3+P_2O_5)$ | 86 – 91 |
| $(CaO+MgO+ZnO+Na_2O)$ | 2.5 – 6 |
| $(SiO_2+Al_2O_3+P_2O_5+Li_2O)$ | no more than 93 |
| $TiO_2 + ZrO_2$ | 2 – 6 | where the ratio of $(CaO+MgO+ZnO+Na_2O+B_2O_3)$ to $Li_2O$ is less than 2.4 and the ratio of $SiO_2$ to $Al_2O_3$ is no more than 3.8 and is usually no more than 3.3. An example of this class of thermally crystallizable glasses that provides a glass-ceramic having an average coefficient of linear expansion of $0 \times 10^{-7}$/° C. (0°–300° C.) has the following theoretical composition and for an actual tank batch had the following analyzed composition, expressed as various oxides and one chemical element in weight percent:

|  | Theoretical, % | Analyzed, % |
|---|---|---|
| $SiO_2$ | 67.4 | 67.5 |
| $Al_2O_3$ | 20.9 | 22.1 |
| CaO | 2.7 | 2.6 |
| ZnO | 1.3 | 0.5 |
| $Li_2O$ | 3.9 | 3.59 |
| $TiO_2$ | 1.8 | 1.9 |
| $ZrO_2$ | 2.0 | 1.95 |
| $Na_2O$ | 0.5 | 0.80 |
| Cl | 0.2 | * |
| $Sb_2O_3$ | 0.4 | * |

*Not analyzed.

The differences are believed to be due to alumina pick-up and volatilization loss in the case of ZnO.

This glass-ceramic as an article was prepared by placing the glass as an article about 2 inches thick and at 1300°–1700° C. in a preheated oven at 1000° F. The oven temperature was increased to 1150° F. because of the presence of the hotter glass article and oven was then maintained at 1150° F. for 3 hrs. followed by increasing the oven temperature to 1350° F. at a rate of 5° F./minute and then maintained at 1350° F. for 50 hours. The glass article then was cooled at the rate of 1° F./minute until 1000° F. was reached, then 5° F./minute until room temperature was reached.

Copending U.S. patent application Ser. No. 362,481 filed by Robert R. Denman on Apr. 24, 1964, and entitled "Ceramics and Method" with common assignee now U.S. Pat. No. 3,428,513 describes a process of improving the modulus of rupture of certain compositions of glass-ceramic by an ion-exchange process in which lithium ions in a surface layer of the glass-ceramic article are replaced by larger alkali metal ions, specifically sodium or potassium ions. The glass-ceramic is in the form in which the crystalline phase is primarily beta-spodumene crystals and beta-spodumene-like crystals. To date none of the ion-exchange materials used has provided a similar result with a strength increase for a glass-ceramic of such certain compositions, that are specified in said application Ser. No. 464,147 and in the next paragraph in which the crystalline phase is primarily beta-eucryptite or beta-eucryptite-like crystals.

That Denman patent application is also incorporated by reference. The thermally crystallizable glass composition that forms the glass-ceramic used has the following weight percentage limits based on the total composition:

|  |  |
|---|---|
| $SiO_2$ | 68 – 72 |
| $Al_2O_3$ | 16 – 18 |
| $Li_2O$ | 3 – 4 |
| MgO | 3 – 5 |
| $ZrO_2$ | 1 – 2 |
| $TiO_2$ | 1.2 – 2.4 |
| $P_2O_5$ | 0.8 – 2 |

In addition, small amounts of residual arsenic and antimony oxides are often present in the composition, since arsenic or antimony compounds are often used as fining or oxidizing agents. In actual practice, arsenic, expressed as $As_2O_3$, is usually present in amounts not more than 0.3 weight percent, and antimony, expressed as $Sb_2O_3$, is seldom present in amounts over 1 weight percent. Sodium oxide is often present in the glass to a certain degree from the raw materials, usually in amounts not over 1.5 or 2 weight percent. Further, when $As_2O_3$ is used as a fining agent, it is commonly added together with a little $NaNO_3$, a well-known practice. Another additive sometimes employed is F, usually in amounts not exceeding 0.3 weight percent. It is added as a salt in the usual manner and seems to aid the crystallization process somewhat when it is employed. Thus, it seems to accelerate the rate of crystallization, sometimes to such an extent that harmful exothermic effects result; hence, it is usually undesirable to have any more than 0.25 to 0.3 fluorine present, expressed as weight percent F, in the final glass composition.

This glass is formed, e.g., by melting a batch of suitable ingredients in a gas-fired furnace at a temperature of about 2900° F. and after fining is cooled to a suitable temperature for flowing, casting or any other feeding step to form glass articles which are then heat treated, first, at a low temperature to form many nuclei or crystallites, and thereafter at a higher temperature to complete crystallization to the desired degree. The final maximum crystallization temperature is about 1800° to 2100° F. and the average coefficient of linear expansion (0°–300° C.) is less than $20 \times 10^{-7}$ ° C. and usually about $15 \times 10^{-7}$ /° C. In one example a glass-ceramic article having, and made from a thermally crystallizable glass having, the following analyzed composition was immersed in a molten bath of sodium nitrate at 750° F.

for ½ hour for some articles and for 3 hours for others, followed by cooling, water washing and drying:

| Ingredient | Weight Percent |
|---|---|
| $SiO_2$ | 70.4 |
| $Al_2O_3$ | 16.8 |
| MgO | 4 |
| $Li_2O_3$ | 3.5 |
| $ZrO_2$ | 1.3 |
| $TiO_2$ | 1.8 |
| $P_2O_5$ | 1.5 |
| F | 0.09 |
| $Na_2O$ | 0.5 |
| $As_2O_3$ | 0.15 |

The original glass had an annealing point of about 1220° F. The ion-exchanged glass-ceramic articles had very high unabraded and high abraded values of modulus of rupture.

The preceding paragraphs refer to ion exchange for the purpose of improving the strength of a specific type of glass-ceramic. Before that invention the prior art had disclosed the technique of changing the properties of glass articles by ion exchanging one alkali metal for another in the surface layer of the glass article. This ion-exchange process can be one of two types of substitution. In the one embodiment the replacing alkali metal ion has a larger ionic diameter or radius than the alkali metal ion being replaced. In the second embodiment the replacing alkali metal ion has a smaller ionic diameter than that of the alkali metal ion being replaced. H. G. Fischer and A. W. LaDue disclose and claim in their copending U.S. patent application Ser. No. 504,159, filed on Oct. 23, 1965 now U.S. patent No. 3,481,726, and entitled "Process and Product" with common assignee, a method in which ion exchange of one alkali metal for another is accomplished by using a liquid medium containing an alkali metal salt or an organic acid.

E. F. Grubb and A. W. LaDue in their copending U.S. patent application Ser. No. 529,215, filed on Feb. 23, 1966, and entitled "Process and Product" with common assignee, now U.S. Pat. No. 3,498,773 discloses and claims another ion-exchange method in which the alkali metal ion, that is to substitute for another alkali metal ion in the surface layer of the glass article, is used as a compound that is not molten when in contact with the glass at the elevated temperature used for the ion exchange.

In view of the methods of said Fischer et al. and Grubb et al., hereby incorporated by reference, it will be apparent that there have not been developed several different techniques for ion exchange.

The ion-exchange process has been used to treat glass, that is not thermally crystallizable, to convert a surface portion of the glass article to a composition that at the temperature used for the ion exchange, if sufficiently high, will crystallize to form a glass-ceramic in which the crystals are referred to as beta-spodumene crystals. If the entire article were of this surface layer composition, it is reasonable to expect for some specific compositions that only the surface would crystallize. The product of this process is referred to as a surface crystallized glass article, as distinguished from the conventional glass-ceramic which is commonly referred to as bulk crystallized product. As a result of this process in which sodium ions are replaced by lithium ions of a molten lithium salt bath in which the glass article is immersed at the elevated temperature, the compositonal change in such that surface crystallization occurs while the main body or interior portion remains unchanged in composition and thus remains as glass. This process is disclosed in U.S. Pat. No. 2,779,136.

Copending U.S. patent application Ser. No. 371,089, filed on May 28, 1964, by William E. Smith and entitled "Glass, Ceramics and Method" with common assignee, now U.S. Pat. No. 3,528,828 discloses and claims a type of thermally crystallizable glass that, for example, as a glass has an expansion coefficient of about $90 \times 10^{-7}/°$ C. but as a glass-ceramic has an expansion coefficient between $100 \times 10^{-7}/°$ C. and $120 \times 10^{-7}/°$ C. For the glass-ceramic the actual value of the coefficient is determined by the temperature and time of heat treatment for the controlled crystallization. The crystalline phase of that glass-ceramic is nepheline. That application is hereby incorporated by reference.

Another type of composition of thermally crystallizable glass and the glass-ceramic made from it are disclosed in British Pat. Specification No. 869,328. The ingredients include silica, alumina and soda and thus the glass-ceramic has nepheline as its primary crystalline phase.

William E. Smith in another copending U.S. patent application, which is application Ser. No. 532,058, filed on Mar. 7, 1966, and entitled "Process and Product" with common assignee, now U.S. pat. No. 3,486,963 discloses and claims a process for treating an article of a glass-ceramic to convert at least an area of its surface layer to a noncrystalline glass under conditions to maintain the main body portion of the article as a glass-ceramic. That invention requires that the glass-ceramic has a coefficient of linear expansion that it at least 5% and is a maximum of about 200% greater than that of the noncrystalline glass of the same overall chemical composition, which, of course, is the glass formed as a surface layer by the process. That application is hereby incorporated by reference.

OBJECTS OF THE INVENTION

It is an object of the present invention to provide an article with a main body portion that is a glass-ceramic and at least one surface layer that is either a glass-ceramic or a glass, in which the surface layer (1) has a lower coefficient of linear expansion than that of the main body portion, (2) has a compressive stress whereas the main body portion has a tensile stress, and (3) differs (a) by overall chemical composition from that of the main body portion, (b) by greater crystal concentration or by the predominant crystal of the crystalline phase of the glass-ceramic from the crystal concentration or from the predominant crystal, respectively, in the crystalline phase of the glass-ceramic of the main body portion, or (c) by its glass matrix having a different chemical composition, e.g., higher lithia content, than that of the glass matrix of the main body portion.

It is another object of this invention to provide processes for the manufacture of such article.

It is still a further object of the invention to provide a process of manufacturing a glass-ceramic article by in situ crystallization of a glass article by a process that minimizes change in shape of the article during the controlled heat treatment to convert the glass to a glass-ceramic, and especially to use this process as part of an overall process to make an article that is of the type recited above as the first object of the present invention.

These and other objects of this invention will be apparent to one skilled in this art from a description of various embodiments of the invention that follow.

DESCRIPTION OF THE INVENTION

The following examples are presented for the purpose of illustrating various embodiments of the process of the present invention and, of course, the products obtained by these embodiments of the process are illustrative of the product of this invention. The first example is a description of one embodiment, along with details of illustrative conditions used in carrying out the process and an evaluation of the product obtained from the standpoint of its flexural strength, i.e., modulus of rupture, without abrasion of the product and after abrasion. For comparison there are presented the unabraded and abraded flexural strengths of untreated glass-ceramic obtained by the in situ crystallization but without the treatment for ion exchange. The temperature used for the ion exchange will result in an in situ crystallization of a suitable glass for the production of beta-eucryptite crystals as a crystalline phase.

The flexural strength or modulus of rupture of a glass or a glass-ceramic is determined in the following manner. Glass cane is obtained by pulling it from molten glass. The glass cane is cut into 5-inch long sample rods that have a diameter of about 3/16 inch.

When the flexural strength is to be determined for glass-ceramic obtained from such glass, as in the present case, the glass cane is converted to a glass-ceramic by a heat treatment. First the cane is heated to and maintained at a suitable temperature for the formation in the glass of crystals of a nucleant, such as titania or titania and zirconia, followed by a predetermined pattern of heat treatment at higher temperatures to obtain a crystalline phase from the main components of the glass. The balance of the glass ingredients remain as a glass matrix. The resultant glass-ceramic sample rods are then tested for flexural strength after or without abrasion. In the present case the abrasion comprised manually rubbing the sample rods of glass-ceramic with No. 320 emery paper.

The flexural strengths of the sample rods are determined using a Tinius-Olson testing machine. This machine applies a measured load through a single knife edge to the center of the sample rod supported on two knife edges that are four inches apart (3-point loading). The load is applied at a constant rate of 24 lbs. per min. until failure occurs with a marker indicating the highest load applied to the point of failure. A dial micrometer calibrated in inches and equipped with a bar contact instead of a point contact was used to measure the maximum and minimum diameters at the center of the sample to an accuracy of 0.0005 inch. Since few sample rods are perfectly round, the load is applied normal to the maximum diameter and the standard formula for an elliptical cross-section is used in calculating the modulus of rupture (MR) as follows:

$$MR = \frac{(10.185) \times Load}{D_1^2 \times D_2}$$

The modulus of rupture in this formula gives the flexural strength in pounds per square inch of cross-sectional area at failure. The data for flexural strengths are based on the average of the values obtained for a number of sample rods.

EXAMPLE I

A molten glass was made with batch materials to provide the following composition:

| Ingredients | Weight % |
| --- | --- |
| $SiO_2$ | 47.2 |
| $Al_2O_3$ | 31.1 |
| MgO | 10.5 |
| $Na_2O$ | 1.5 |
| $ZrO_2$ | 8.0 |
| $TiO_2$ | 1.5 |
| $SnO_2$ | 0.2 |

This glass was made in a pot in a conventional manner that is well known in the art. This glass had a liquidus of greater than 2760° F. Glass cane was drawn from the molten glass. The silica, alumina and magnesia contents were within the broad and preferred ranges of glasses that are utilized in the process disclosed and claimed in U.S. Pat. No. 3,117,881. The glass contained, as nucleants, titania and a larger amount of zirconia. These are utilized in various compositions of that patent. The tin oxide would provide the function in the glass manufacture that is described in that patent. The 1.5% by weight of soda in the glass was within the broad and preferred ranges of modifying agents permitted in the thermally crystallizable glass of that patent. This specific glass had an average coefficient of linear expansion (0°–300° C.) of $33.7 \times 10^{-7}/°$ C.

The glass cane was cut into sample rods. Most of the sample rods were heat treated as follows to convert them to a glass-ceramic. These rods were heated to and maintained at 1450° F. (788° C.) for 1½ hours, heated to and maintained at 1750° F. (954° C.) for 1½ hours, heated to and maintained at 2000° F. (1093° C.) for 1½ hours, and then cooled gradually to room temperature. By this treatment the glass of the rods was converted to a glass-ceramic. Cordierite crystals are the predominant crystals in the crystalline phase. This glass-ceramic had an average coefficient of liner expansion (0°–300° C.) of $59.0 \times 10^{-7}/°$ C. which is greater than that of the glass.

Sample rods of this glass-ceramic after preheating for one-quarter hour at 1450° F. while suspended in a tubular furnace were moved laterally by moving the tubular furnace directly above another furnace containing salt in a crucible liner in a metal container. The latter furnace was maintained at a temperature of 1450° or 1500° F., at which temperature salt was molten. The molten salt bath contained, on a weight basis, 75% lithium sulfate, 24% potassium sulfate and 1% sodium hydrogen sulfate. The rods were lowered for immersion in the molten salt for specific periods of time, raised from the bath, cooled gradually in air, water washed and then dried.

Most of the ion-exchanged treated sample rods of glass-ceramic were abraded, as described above. Some were tested for flexural strength without any abrasion. Sample rods of glass-ceramic that had not been subjected to the molten salt bath immersion were also treated for flexural strength, some without abrasion and some with abrasion. The results are tabulated below:

| Temperature of Salt Bath, °F. | Time of Immersion, hrs. | Flexure Strength, p.s.i. Unabraded | Abraded |
|---|---|---|---|
| — | 0 | 22,000 | 14,000 |
| 1450 | 1.5 | 34,300 | 27,000 |
| 1450 | 4.0 | — | 31,000 |
| 1500 | 1.5 | — | 27,200 |

As seen in some of the copending patent applications mentioned above, a temperature of 1450° and 1500° F. will provide as in situ crystallization to form a crystalline phase that contains predominantly beta-eucryptite. Thus the temperature of the molten salt treatment was sufficiently elevated to provide in that exterior part at least of the surface layer an in situ crystallization of part of the glass matrix of the initial glass-ceramic changed in composition by replacement of sodium ions by lithium ions. The coefficient of linear expansion of $59 \times 10^{-7}/°$ C. of the initial glass-ceramic would certainly be greater than that in the surface layer after substitution of lithium for sodium in the glass matrix and especially after conversion of part of the changed glass matrix in at least the exterior part of the surface layer to beta-eucryptite in view of its very low expansion coefficient as compared with cordierite. Thus the process provides in at least the exterior part of the surface layer by ion exchange, a reduction in the expansion coefficient. This an account for the improved flexural strength after the process of ion exchange under conditions that provide also in situ crystallization. This compressive stress surface layer also provides a retention during a specific abrasion of flexural strength greater than that of the unabraded initial glass-ceramic.

For comparison, sample rods of the initial glass were similarly preheated for one hour at 1400° or 1450° F., were immersed for one-half hour in that molten salt at the temperature of preheating and then treated further. In the case of the glass rods that were immersed at 1400° F., they were slowly cooled in air at the conclusion of the salt immersion. An examination of these treated glass rods indicated that no compressive stress surface layer had been formed. In the case of the glass rods immersed in the molten salt at 1450° F., they were post treated after the immersion in the molten salt by heating for one hour at 1720° F. (938° C.) and then for another 1½ hours at 1920° F. (1049° C.) which resulted in rods that had wrinkled surfaces. It was concluded that these treatments of glass rods resulted in relatively weak rods. These results in comparison with those using the ion-exchange salt treatment of the glass-ceramic rods show that, with this type of overall composition, the improvement in strength is obtainable only when an article is treated with molten salt at such temperature when this composition is a glass-ceramic rather than a thermally crystallizable glass.

Pure stoichiometric cordierite is a magnesium aluminosilicate crystalline material with the formula $2MgO.2Al_2O_3.5SiO_2$. The glass composition of this example by the in situ crystallization produces a cordierite crystalline phase and a glass matrix in which the magnesia content and the soda content are substantially less than and substantially greater, respectively, than that of the initial glass. The replacement of sodium ions by lithium ions in the surface layer of such glass matrix provides a lithia content for the glass matrix such that an in situ crystallization of beta-eucryptite occurs at the ion-exchange treatment if sufficiently high or if not by later heat treatment. This lowers additionally the expansion coefficient of the surface layer. The interior portion of the surface layer may not have sufficient lithia content to provide crystallization, but it will lower somewhat the expansion coefficient of that portion of the surface layer.

If a temperature sufficiently lower than that used in Example I for the ion exchange is used, the time of treatment would be increased for a comparable degree of ion exchange. Such lower temperature can be sufficiently low than in situ crystallization will not occur. Then the glass-ceramic after such ion exchange with suitable lithium-containing medium is followed by a heat treatment of the rods at an elevated temperature sufficient to provide the in situ crystallization, thereby attaining generally the same result as described above for the ion-exchange treatment at an in situ crystallization temperature.

In view of the foregoing presentation of prior art and Example I for one embodiment of the present invention, it is not necessary to present other embodiments of the invention in the same amount of detail. These embodiments can be utilized by one of ordinary skill in this art in view of this entire disclosure and the prior art.

The embodiment that is illustrated by Example I is the process of converting an article of thermally crystallizable glass composition to a glass-ceramic followed by replacement of an alkali metal ion of the surface layer of the glass matrix by an alkali metal ion having a smaller ionic radius at a temperature that provides in situ crystallization or at a lower temperature followed by heating at a temperature for such crystallization wherein the formed crystals are different than those in the crystalline phase of the initial glass-ceramic and have a lower coefficient of expansion. Of course, in this example the surface layer will contain, in addition to the newly formed crystals, the crystals of the main body portion of the glass-certami rods but these newly formed crystals are not necessarily separate from the initial crystalline phase. They may be formed on the surfaces of the initial crystalline material and, of course, formation of the new crystalline material as separate crystals is not a necessary part of the present invention. Furthermore, in certain cases ion exchange without concomitant or subsequent in situ crystallization is one embodiment of the present invention, whether the surface layer is glass or glass-ceramic. Of course, the main body portion is glass-ceramic.

Example II.

An article of thermally crystallizable glass composition of the type, that by in situ crystallization forms a glass-ceramic with a crystalline phase that is predominantly nepheline, is converted to an article of glass-ceramic by suitable heat treatment, as described earlier with reference to British Pat. No. 869,328 and Smith patents applications Ser. Nos. 371,089 and 532,058.

In one embodiment the heat treatment at a specific final temperature is for a period of time less than one-half of that which will produce the maximum amount of crystalline phase so that the glass matrix of the glass-ceramic will contain a substantial amount of soda. In this embodiment the glass-ceramic article is treated with a lithium-containing ion-excange material, such as the molten mixture of salts including lithium sulfate mentioned above, at an elevated temperature that is at least about 200° C. (about 400° F.), and preferably at least about 350° C. (about 660° F.), for a period of time to replace sodium ions by lithium ions in the glass matrix in a surface layer of the glass-ceramic article. This ion exchange converts the glass matrix in the surface layer to a glass composition having a lower expansion coefficient than the initial glass matrix and thus lower than that of the glass matrix in the main body of the glass-ceramic article, so that the surface layer has a compressive stress and the main body portion has a tensile stress. When the ion-exchange treatment is conducted at an elevated temperature that is below the strain point of the glass matrix, it is necessary to heat the article after the ion exchange to a higher temperature sufficient to relieve tensile stress in the surface layer created by the smaller ions replacing the larger ions. The compressive stress in the surface layer is created because of the difference in expansion coefficient between that layer and the main body portion. It is preferred that the ion exchange be conducted at a temperature above the strain point of the glass matrix of the initial glass-ceramic article. A temperature between 500° C. (about 950° F.) and 850° C. (about 1560° F.) is preferred. A temperature of at least 700° C. (about 1300° F.) is especially preferred. When the time and temperature of the ion exchange are sufficiently long and high, respectively, and with suitable choice of initial glass composition and of extent of crystallization prior to the ion exchange, there is a further in situ crystallization in the surface layer. The new crystals are beta-eucryptite. The surface layer already contains a crystalline phase which, of course, is predominantly nepheline. This additional crystallization in a surface layer results in a different glass-ceramic composition than that of the main body portion. Beta-eucryptite has a lowr expansion coefficient than nepheline. Thus the glass-ceramic of the surface layer has a lower expansion coefficient than the main body portion. Also this glass-ceramic of the surface layer has a lower expansion coefficient than that of the surface layer in which only ion exchange occurs.

In another embodiment using this glass-ceramic in which nepheline is the predominant crystal in the crystalline phase, the surface layer of the glass-ceramic article is heat treated, such as by flame treating, in accordance with the process disclosed in Smith patent application Ser. No. 532,058, and ion-exchange treated to replace sodium ions in the surface layer of thermally crystallizable glass by lithium ions in the manner mentioned above. The glass of the surface layer before the ion-exchange treatment has a lower expansion coefficient than the glass-ceramic main body portion. This difference is further enhanced by this ion exchange. By judicious choice of initial glass composition and degree of ion exchange, part of the glass surface layer can be converted to crystals of beta-eucryptite with heat treatment at temperatures described earlier, because such compositions contain substantial amounts of nucleant and substantial contents of the three ingredients that form beta-eucryptite.

The process of the Smith application Ser. No. 532,058 excludes the use of a glass-ceramic that has a lower coefficient of linear expansion than the thermally crystallizable glass from which it is obtained. The conversion of a surface layer of an article of such glass-ceramic to the glass followed by cooling the glass layer results in spalling or breaking away of the surface layer because a tensile stress is created in the surface layer by this difference in expansion coefficient.

If there is an ion exchange of a larger ion for a smaller ion after forming the glass layer as in one embodiment of that Smith process, the cooling is only to a temperature below the annealing point and usually below the strain point of the glass at which the exchange takes place to provide a compressive stress. However, cooling to such temperature also creates this undesirable tensile stress.

The second embodiment of the present invention avoids such spalling, because the ion-exchange process of such glass surface layer can be carried out at a temperature above the annealing point. A subsequent cooling of the article to room temperature without damage by spalling is possible, because the surface layer now is a glass that has a lower expansion coefficient than that of the glass-ceramic main body portion. When the process of this invention converts the ion-exchanged glass surface layer to a glass-ceramic layer during or after the ion exchange, the article is ultimately cooled to room temperature. There is no spalling damage, because the glass-ceramic of the surface layer has a substantially lower expansion coefficient than that of the glass-ceramic of the main body portion and thus a compressive stress has been created in the surface layer.

The foregoing advantage of this embodiment, as compared with the limitation of the process of Smith application Ser. No. 532,058 is because an alkali metal ion is replaced by another alkali metal ion having a smaller ionic radius. This replacement is performed at or is followed by heating the article to a temperature above the strain point, even above the annealing point.

EXAMPLE III

This example uses an article of a thermally crystallizable glass composition such as disclosed in Table II of U.S. Pat. No. 2,920,971 of U.S. patent applications Ser. Nos. 352,958, 362,481 and 464,147.

In one embodiment, thermally crystallizable glass of the article is converted to a glass-ceramic in which the crystalline phase is predominantly beta-spodumene and beta-spodumene-like crystals so that the article of glass-ceramic formed has an expansion coefficient between $10 \times 10^{-7}/°$ C. to $20 \times 10^{-7}/°$ C., such as $15 \times 10^{-7}/°$ C. The surface layer of this glass-ceramic article is heated to convert it, without converting the main body portion, back to the thermally crystallizable glass. This glass is converted by heat treatment, under conventional conditions of the type described earlier in connection with the prior art, to convert it to a glass-ceramic in which the crystalline phase is predominantly beta-eucryptite. The resultant article has a surface layer of a different glass-ceramic with a lower coefficient of linear expansion than that of the glass-ceramic of the main body portion. Based upon the thermal treatments received by the glass of the surface layer and the glass of the main body portion, it is expected that the surface layer has an expansion coefficient, for example, of $-10 \times 10^{-7}/°$ C. while the main body portion has an expansion coefficient of $15 \times 10^{-7}/°$ C. In this case there is no difference in overall chemical composition between the surface layer and the main body portion. The difference is in the nature of the crystals of the crystalline phase of the two glass-ceramics that constitute the surface layer and the main body portion.

In the foregoing first embodiment of this example, the initial thermally crystallizable glass has a higher expansion coefficient than that of the glass-ceramic of that composition and containing beta-spodumene. The conversion of the surface layer of the article from this glass-ceramic to the thermally crystallizable glass results initially in a product having a surface layer with a higher expansion coefficient than that of the main body portion. In this embodiment, it is desirable, and when the difference is too great, is necessary that the article is maintained above the strain point and preferably above the annealing point between the heat treatment that forms the glass surface layer and the heat treatment that converts the glass of the surface layer to a glass-ceramic in which beta-eucryptite is the predominant crystalline material. Accordingly, the entire article is preferably heated to a substantial elevated temperature, preferably above the annealing point of the thermally crystallizable glass, before the heat treatment, such as flame treatment, of a surface layer of the glass-ceramic to form the glass surface layer and the entire body is maintained at such temperature until in situ crystallization occurs in the surface layer. Of course, this temperature is below the temperature at which crystallization occurs to form beta-spodumene. This is the preferred embodiment of the present invention.

Under certain conditions including the maximum temperature reached by the surface layer and dependent upon the titania content of the initial thermally crystallizable glass, titania may be redissolved when the surface layer is heated to form a surface layer of glass. In such event, the temperature of the entire article is maintained such that the temperature of the newly formed glass surface layer is lowered to the nucleation temperature. The temperature of the article is then raised to cause the in situ crystallization for beta-eucryptite crystal formation by a programmed heat treatment as described in the U.S. patent and patent applications mentioned above.

In a second embodiment of this example, the article is made of thermally crystallizable glass that contains only a minimum content of lithia and a maximum amount of soda but an adequate content of nucleant to provide bulk crystallization. The article is entirely converted to the glass ceramic by controlled heat treatment. The article is ion exchanged in its surface layer to replace sodium ions with lithium ions. The temperature during the ion exchange is preferably at the high elevated temperature mentioned above. At lower exchange temperatures tensile stress is created, but the later in situ crystallization temperature relieves such stress and creates compressive stress. However, while at the lower temperature damage to the article can occur in certain cases. The time and temperature for ion exchange can provide for an in situ crystallization of beta-eucryptite in the surface layer during at least the final period of the ion-exchange treatment. This glass-ceramic obtained from the ion-exchanged surface layer has a lower expansion coefficient than that of the main body portion. This aspect of this invention is thus (1) the difference in expansion coefficients of the glass matrix of the surface layer and the main body portion, (2) additional crystal formation with added lithia to form beta-eucryptite either during the ion exchange or later, (3) reduced soda content in the glass matrix of the surface layer and (4) reduced molar content of all alkali metal in this glass matrix that results in a lower expansion coefficient than the initial glass matrix.

The second embodiment is modified by use of a final temperature sufficiently high to convert lithium values introduced by the ion exchange to beta-spodumene. This changes the composition of the glass matrix to a composition having a lower expansion coefficient. Furthermore, the glass-ceramic of the surface layer has a lower coefficient of expansion in this case because the concentration of beta-spodumene in the surface layer is greater than that in the main body portion. In this modification the surface layer, that is ion exchanged, is the initial glass-ceramic or the glass obtained from it.

In another embodiment of this example, the thermally crystallizable glass composition of the article may contain a small soda concentration or content. It is preferred that the soda content be very low or that soda be absent. The article of this glass is ion exchanged to replace part of the lithium ion content with sodium ions using one of the well-known ion-exchange processes. The temperature is not required to be below the strain point for a long time of treatment or at a maximum temperature of about 100° F. above the annealing point for a short time, because this ion exchange is not performed to create a compressive stress surface layer. Thus the preferred temperature is substantially above the annealing point, but below the softening point of the glass.

During the ion exchange of this embodiment the temperature may be such that nucleation may occur. The degree of nucleation may be insufficient. Thus the article after the ion exchange is subjected to heat treatment for nucleation. The glass article, now ion exchanged in a surface layer and nucleated throughout, is heat treated as indicated in the patent and applications mentioned above to convert the main body portion to a glass-ceramic.

The extent of ion exchange is controlled for certain articles so that the composition of the surface layer is such that it will also form glass-ceramic, but at a slower rate than the crystallization of the main body portion. This is desirable to avoid flow of the glass surface layer at the high temperatures required for this in situ crystallization of the main body portion. Obviously, this is not a necessary limitation when only one surface of the article is ion exchanged and that surface is flat, because it can be maintained horizontal and above the main body portion to prevent gravity flow with peripheral guards, if necessary, during the heating for in situ crystallization.

After the article has its main body portion converted to the glass-ceramic, the article is then ion exchanged to replace sodium ions with lithium ions in the entire surface layer, whether the surface layer is glass or glass-ceramic with its content, i.e., concentration, of beta-spodumene being less than that in the main body portion. Then the article is thermally treated under the proper program of heat treatment, as disclosed in U.S. patent applications mentioned above, to convert the introduced lithium and some ingredients including lithium already present to crystals of beta-eucryptite. In view of the replacement of soda content in the surface layer, this heat treatment by in situ crystallization to beta-eucryptite utilizes lithia content that did not form beta-spodumene within the time of the first in situ crystallization. Thus the surface layer is a glass-ceramic and now has a lower expansion coefficient than that of the main body portion.

EXAMPLE IV

The glass of the entire initial article is a thermally crystallizable glass composition of the type of Example III. This glass contains an amount of soda within the top portion of range of soda content that does not prevent in situ crystallization to form glass-ceramic that will contain either beta-eucryptite or beta-spodumene or both. The glass article is treated by ion exchange to replace sodium in its surface layer by lithium in accordance with any of the processes of ion exchange already known for glass, such as are described above. This results in a surface layer of thermally crystallizable glass composition that differs from that of the main body portion. The surface layer has a higher lithia content and a lower soda content than that of the main body portion. In this embodiment, the nucleating agent or agents are present at concentrations sufficient for bulk crystallization only at a slow rate, e.g., a rate less than one-fourth of the maximum rate obtainable with maximum permissible content of nucleant.

This article of glass with a surface layer of ion-exchanged glass is heat treated to a temperature that will provide a surface crystallization, i.e., an in situ crystallization in the surface layer, to form beta-eucryptite. This surface crystallization will occur before in situ crystallization of the main body portion, because the surface crystallization is not dependent upon the presence of special nucleants in the glass.

It is known in the prior art, as illustrated by the teaching of U.S. Pat. No. 2,779,136, that surface crystallization can occur at temperatures as low as between 600° C. and 750° C. (between 1112° and 1382° F.). These temperatures are below temperatures for bulk in situ crystallization. The advantage of this surface crystallization is that the subsequent program of heat treatment, including a nucleation heat treatment, is carried out on an article that has a surface layer of glass-ceramic rather than glass. This surface layer of glass-ceramic avoids or minimizes change in shape due to sagging or flow during the bulk crystallization temperature treatment.

This article, with its surface layer of glass-ceramic due to surface crystallization, is subjected to a program of heat treatment to convert the entire article to a glass-ceramic that is predominantly beta-eucryptite or beta-eucryptite-like crystals or a mixture of these and beta-spodumene and beta-spodumene-like crystals or predominantly beta-spodumene and beta-spodumene-like crystals. The process of this example uses a separate facet of the invention that does not require ion exchange and other steps subsequent to the bulk crystallization treatment.

EXAMPLE V

The entire article obtained by Example IV is converted by heat treatment of prolonged duration to a glass-ceramic in which beta-spodumene and beta-spodumene-like crystals predominate in the crystalline phase. This article of glass-ceramic containing beta-spodumene is heat treated to form a surface layer of glass as described in earlier examples. The glass is converted to beta-eucryptite in accordance with one of the earlier embodiments of Example III.

EXAMPLE VI

Example IV describes an aspect of the invention in which there is an ion exchange of an article of a thermally crystallizable glass to convert a surface layer to a composiion that, by heat treating within a temperature range, will surface crystallize without bulk crystallization. The composition of the original glass will bulk crystallize but at a slow rate due to its specific composition. Ion exchange changes this composition in the surface layer so the latter will easily and rapidly surface crystallize. These thermally crystallizable glasses form glass-ceramics in which alternatively beta-eucryptite and beta-spodumene crystals or mixtures of both are present.

This advantage of surface crystallization of a glass prior to bulk crystallization can be utilized with other types of thermally crystallizable glasses, e.g., those that form a glass-ceramic in which nepheline or cordierite are the predominant crystals. The glass is ion exchanged to replace sufficient sodium in the surface layer by lithium. During the ion-exchange treatment, if its temperature is sufficiently high, or after it treatment at an elevated and suitable temperature produces surface crystallization. This article is heat treated, with less change of its shape, to a glass-ceramic for the main body portion that is either a nepheline type, a cordierite type or some other type other than beta-spodumene or beta-eucryptite. The glass-ceramic of the surface layer is converted to a glass-ceramic in which the crystals are beta-eucryptite or beta-spodumene or both, dependent upon the final temperature required for in situ crystalization of the main body portion. That temperature depends on the type of initial glass composition.

The initial glass can be modified by incorporating a limited amount of lithia. This initial lithia content along with the lithia content provided by the ion exchange gives a surface layer composition that is convertible to the glass-ceramic by surface crystallization as described above.

After the bulk crystallization, this article has a compressive stress surface layer due to the difference in expansion coefficients between the main body portion and the layer that are two different glass-ceramics.

EXAMPLE VII

The article obtained in Example VI is selectively heated to convert the surface layer to glass, while the main body remains as glass-ceramic followed by heat-treatment to glass-ceramic in which beta-eucryptite is the predominant crystal.

EXAMPLE VIII

A glass article having the composition of Example VI is ion-exchanged, surface crystallized and then bulk crystallized. The surface layer is then ion exchanged to substitute sodium for lithium in the glass matrix that was not utilized in the surface crystallization to form, by further heat treatment, additional crystals comparable to those in the main body portion. Thus the second ion exchange replaces lithium by sodium.

EXAMPLE IX

The surface layer of the article of Example VI after the bulk crystallization is selectively heat treated, such as by flame treating, to form a glass, while the main body remains as glass-ceramic. This glass is ion exchanged to replace lithium with sodium followed by in situ crystallization at the surface layer so that the surface layer and the main body portion now have the same overall composition. In this alternative, the surface layer is used only for surface crystallization to minimize shape change during subsequent bulk crystallization. It is not used for the objective of making a final article with a surface layer having a compressive stress due to a lower expansion coefficient for the surface layer as compared with a different overall composition than that of the main body portion.

EXAMPLE X

An article of a glass containing on a weight basis the following ingredients: 62.9% $SiO_2$; 14% $Al_2O_3$; 6% MgO; 5% CaO; 1.7% $Li_2O$; 4.3% $TiO_2$; 3.1% $Na_2O$ and 3% $B_2O_3$ is made. This glass has an expansion coefficient between 25° C. and 300° C. of $45 \times 10^{-7}/°$ C. This glass is Example 1 of Table 1 of U.S. patent application Ser. No. 410,016 entitled "Glass, Ceramic and Method" filed by Richard W. Petticrew on Nov. 9, 1964 now U.S. Pat. No. 3,540,893, with common assignee, and hereby incorporated by reference.

By heat treatment for 2 hours at 1300° F., 2 hours at 1450° F. and 1 hour at 1550° F., it is converted to a glass-ceramic with an expansion coefficient, for the same temperature range, of $43 \times 10^{-7}/°$ C. and a modulus of rupture of 66,000 p.s.i. The high strength is attributed by Petticrew partially to a formation of lithium-containing crystals in a larger amount in the surface layer than obtained in the main body portion of the article. In the main body portion the crystalline phase of the glass-ceramic is predominantly cordierite.

This article of thermally crystallizable glass is treated, in accordance with the present invention, by an ion-exchanging material, such as described earlier, to replace at least part of sodium ions by lithium ions in the surface layer of the article, thereby increasing the lithia content of the surface layer. In the present process, the article is then heat treated as described by the Petticrew patent application for bulk crystallization. Because of the ion exchange a higher concentration of lithium-containing crystals, e.g., beta-eucryptite is formed in the surface layer to provide a lower expansion coefficient for the surface layer than that obtainable by the heat treatment without the ion exchange.

In another embodiment, the glass-ceramic article obtained in Example 1 of Petticrew's patent application is heated to convert a surface layer to thermally crystallizable glass while maintaining the main body portion as glass-ceramic. This glass surface layer is ion exchanged to replace sodium with lithium. The heat treatment of the ion-exchanged glass layer to glass-ceramic containing beta-eucryptite or beta-spodumene is then performed, as described in earlier examples.

The foregoing description of composition has mentioned various ingredients. These constitute at least 90% and preferably at least 95%, by weight of the compositions.

The depth of the surface layer of the article of the invention can be varied widely, e.g., from 10 microns to 200 microns or more. When this surface layer is formed by ion exchange, the depth obtained by this exchange is desirably less when a later ion exchange is used as part of the overall process because the second ion exchange should replace the ion first substituted with an ion of the type first replaced. To do this effectively a shallow layer is desired in the first exchange.

The difference in average coefficient of linear expansion between that of the surface layer and that of the main body can be varied widely. The minimum numerical value for the difference is dependent upon the coefficient of the main body portion. If it is $10 \times 10^{-7}/°$ C., the coefficient surface layer is desirably no higher than about $5 \times 10^{-7}/°$ C., and preferably no higher than about $0 \times 10^{-7}/°$ C. If it is $15 \times 10^{-7}/°$ C., that of the layer is preferably no higher than $10 \times 10^{-7}/°$ C. If the coefficient of the main body portion is about $60 \times 10^{-7}/°$ C., the layer's coefficient is preferably a maximum of $30 \times 10^{-7}/°$ C., which is easily accomplished when the layer is a glass-ceramic containing beta-eucryptite, beta-spodumene or both as the predominant crystal. When the coefficient of the main body portion is about $110 \times 10^{-7}/°$ C., that of the layer is preferably a maximum of about $80 \times 10^{-7}/°$ C., and preferably at least in an outer part of the surface layer of below $50 \times 10^{-7}/°$ C.

Many variations of the invention in view of this disclosure will be obvious to one of ordinary skill in the art.

The foregoing examples have been presented for the purpose of illustration of various embodiments of the process and the product of the present invention which is not limited thereto, but only by the claims that follow.

I claim:
1. A process of making an article having a main body portion of glass-ceramic and an integral surface layer of glass-ceramic and having a lower coefficient of linear expansion than that of the main body portion which comprises
    1. forming an article from a thermally crystallizable glass comprising magnesia, alumina and silica in an overall composition, including nucleant and an oxide of an alkali metal present in a concentration of at least 1% by weight, based on soda mole equivalent, said glass being capable of bulk crystallization to form an article of glass-ceramic by the heat treatment in which the crystalline phase contains cordierite as predominant crystal, and
    2. heat treating the article to convert the glass to glass-ceramic, and
    3. converting a surface layer of the article to a glass-ceramic under conversion conditions such that the surface layer that is obtained is integral with the main body portion and has a lower coefficient of linear expansion than that of the main body portion, said converting comprising
        I. substituting lithium for at least part of said other alkali metal in said surface layer by ion-exchange treatment, and
        II. heat treating the article to convert the surface layer to glass-ceramic containing at least one material selected from the group consisting of beta-eucryptite and beta-spodumene as predominant crystal having said lower expansion coefficient as compared with the glass-ceramic of the main body portion, whereby the article formed has a flexural strength greater than the initial article of glass-ceramic, said surface layer obtained having an overall composition substantially identical to that of the main body portion except that
            a. the lithia content is at least equal to the lithia content in the overall composition of the main body portion,
            b. the content of oxide of other alkali metal, having an ionic radius larger than lithium, is at a maximum equal to the content of that oxide in the overall composition of the glass-ceramic main body portion, and c. when the layer is a glass-ceramic with lithia content equal to that of the main body portion, the predominant crystal in the crystalline phase of the layer differs from that of the main body portion and provides the lower coefficient of linear expansion of the layer.

2. The process of claim 1 wherein the composition of the thermally crystallizable glass on a weight basis is as follows:

| | |
|---|---|
| $SiO_2$ | 47.2% |
| $Al_2O_3$ | 31.1% |
| MgO | 10.5% |
| $Na_2O$ | 1.5% |

-continued

| | |
|---|---|
| $ZrO_2$ | 8.0% |
| $TiO_2$ | 1.5% |
| $SnO_2$ | 0.2% | wherein the glass of the article is converted by heat treatment to a final maximum of 2000° F. to form the glass-ceramic article and wherein the ion-exchange treatment is immersion of the glass-ceramic article in a molten bath at 1450° F. of 75% lithium sulfate, 24% sodium sulfate and 1% sodium hydrogen sulfate on a weight basis for one and one-half hours, said ion-exchange treatment constituting the heat treatment to form beta-eucryptite crystal in the crystalline phase of the glass-ceramic of the surface layer.

* * * * *